United States Patent [19]

Broodman

[11] 4,412,560

[45] Nov. 1, 1983

[54] TUBE FOR A CRACKING PLANT

[75] Inventor: Johannus J. Broodman, Breskens, Netherlands

[73] Assignee: B. V. Koninklijke Maatschappij "De Schelde", Vlissingen, Netherlands

[21] Appl. No.: 362,298

[22] Filed: Mar. 26, 1982

Related U.S. Application Data

[63] Continuation-in-part of Ser. No. 126,715, Mar. 3, 1980, abandoned.

[30] Foreign Application Priority Data

Mar. 2, 1979 [NL] Netherlands ........................ 7901692

[51] Int. Cl.³ .............................................. F16L 9/16
[52] U.S. Cl. ................................... 138/143; 138/144; 138/153; 138/174; 208/130

[58] Field of Search .............. 138/127, 132, 133, 137, 138/140, 141, 142, 143, 144, 153, 174; 228/131, 243; 208/48 AA, 48 R, 106, 130; 585/920, 921

[56] References Cited

U.S. PATENT DOCUMENTS 1,374,858  4/1921  McComb ........................... 208/130
2,360,436 10/1944  Matuszak ........................... 585/920
3,316,630  5/1967  Goedecke et al. ................. 29/473.5

Primary Examiner—James E. Bryant, III
Attorney, Agent, or Firm—Bucknam and Archer

[57] ABSTRACT

Tube for a cracking plant, comprising an inner tube, a coaxial outer tube and a reinforcement layer intermediate said inner and outer tube, said reinforcement layer having openings or passages through which said inner and outer tube are bonded together.

7 Claims, 2 Drawing Figures

TUBE FOR A CRACKING PLANT

This application is a continuation-in-part of U.S. Ser. No. 126,715 filed Mar. 3, 1980, now abandoned.

The invention relates to a tube for a cracking plant, particularly a cracking furnace.

In preparation of ethylene from naphtha pyrolysin at temperatures higher than usual at present, i.e. 900° C., offers the only process which enables to cope with the increasing demand for ethylene.

This process is performed in tubular furnaces, so called cracking furnaces in which saturated hydrocarbons, naphtha in case of ethylene, blended with steam is led through horizontally or vertically mounted tubes which are externally heated to a very high temperature by means of gas burners or oil burners. The endothermic cracking reaction occurs mainly in the radiation zone in the tubes where the highest temperature prevails, that is in the course of a retention time of some seconds to some tenths of a second depending on the installation employed. In the cracking processes usual at present the hydrocarbon-steam mixture is heated at a pressure of about 200 kPa and to a temperature of about 900° C. Subsequently the gaseous cracking effluent is forcibly quenched. Upon heating the hydrocarbon steam mixture within the tube compounds and unsaturated compounds of for instance oxygen, nitrogen and sulphur are formed, being extremely aggressive in particular corrosive and oxidizing. Therefore particular metals can be used only for the tubes, such as highly alloyed nickel. The outside wall of the tubes are in contact with an open fired furnace atmosphere consisting of carbon dioxide, carbon monoxide, hydrogen, oxygen, nitrogen and water vapour, which atmosphere is extremely reducing and oxidizing at the operating temperature, also prohibiting the use of steel.

The recent known processes already have reached a high degree of perfection so that any increase in the yield of ethylene is possible only by increasing the cracking temperature and by reducing the retention time.

It has become possible to reach the above-mentioned temperature of 900° C. by using highly alloyed nickel, for instance 25-20 CrNi. The maximum tube wall temperature then amounts to about 1050° C. at a temperature in the combustion chamber of about 1200° C.

Up till now, however, higher temperatures of the cracking gas are not feasible because the nickel alloys cannot withstand anymore the pressure of the cracking gas in the interior of the tube at higher temperatures than mentioned above.

The use of ceramic material for the tubes did not lead to the desired result mainly because ceramic tubes are uncapable of withstanding the necessary high pressure.

The object of the present invention is to provide a tube for a cracking plant which may be operated during the cracking process at much higher tube wall temperatures between 900° and 1300° C. and higher pressures between 200–500 kPa. Consequently the yield of ethylene may be increased considerably. It will be clear, however, that the use of such tubes is not restricted to ethylene production.

The above-mentioned object is achieved by the tube according to the invention, said tube having a corrugated structure prepared from an inner tube consisting of a metal capable of withstanding at above said temperature an aggressive in particular corrosive medium, which may prevail inside the inner tube, a reinforcement having been placed about said inner tube, said reinforcement being provided with a plurality of openings between the reinforcement parts and consisting of a metal capable of withstanding at above said temperature compressive and tensile forces, to be exerted on the tube by above said pressures, an outer tube coaxially positioned about the inner tube and the reinforcement and consisting of a metal capable of withstanding at above said temperature an aggressive in particular corrosive medium which may prevail outside the outer tube, said reinforcement being made of tungsten, molybdenum or tantalum or alloys of tungsten, molybdenum or tantalum, said inner tube and the outer tube having been bonded together in the openings between the reinforcement parts upon application of heat and pressure on the inner surface of the inner tube and outer surface of the outer tube while applying vacuum to the openings between the reinforcement parts.

The reinforcement may be comprised of wires wound helically in opposite directions about the tube though it may also be comprised of a netting, a braiding of wires or a braided mantle. There may also be wound a single winding on a plurality of parallel axially extending longitudinal wires placed on the inner tube. This reinforcement may furthermore consist of a tube of a suitable material, for instance sheet metals, slid onto the inner tube which tube of suitable material has been provided with a large number of openings, holes or passages, for instance by punching or cutting. A requirement thereby is that there should be a sufficient number of gaps or openings between the reinforcement parts enabling the formation of a firm bond between the inner and the outer tube upon application of heat and pressure.

At the end faces of the bonded tubes there may be applied sealing layers or rings preferably by a building up welding method, using the same material as that of the tubes.

Close to the end faces the reinforcement may be omitted over a short distance from the end face so that at this location where the two tubes have been bonded together an end face surface is obtained solely consisting of the material of the two coaxial tubes.

Preferably the material of both the inner and the outer tube consists of nickel or a nickel alloy such as Inconel 601, that is a nickel based alloy containing chromium in addition to nickel, said materials being capable of withstanding the desired high cracking temperature. However, the material is not restricted to said particular metals. There may be used also for instance cobalt alloys, in general materials capable of withstanding the said high temperature and the same aggressive and corrosive medium.

In view of its strength molybdenum and alloys thereof are suited in particular for the reinforcement. Under the influence of oxygen this material if unprotected would be subject to immediate oxidation at the said high temperature. This reinforcement is, however, completely embedded by the surrounding tubes of nickel or alloys thereof and is consequently very effectively protected against the surrounding medium, while at the same time giving the necessary firmness to the tubes for withstanding the high process pressure as well as a sufficient strength in the longitudinal direction of the tube.

Instead of molybdenum one may, however, also use other suitable materials such as tungsten or tantalum or alloys thereof.

It is self evident that the material of the reinforcement should be of such a nature that the reinforcement maintains its shape at the high bonding temperature and pressure, when the limit of stretching strain of the material of the tubes is surpassed.

The fusion bond between the two coaxial tubes within the openings between the reinforcement parts provides for the necessary good heat transfer from the exterior of the tubes contacting the combustion gases, to the interior thereof containing the steam and/or the cracking gas. This fusion bond also provides for a good sealing in axial direction between the outer and inner tubes if a leakage would occur in one of the tube walls.

The invention will now be elucidated in detail with reference to the drawing representing an embodiment of a tube according to the invention.

FIG. 1 shows one end of a tube according to the invention of which the left hand part in the Figure has been drawn in complete cross section, through both the coaxial tubes. The middle part shows the outer tube only in cross section whereas the right hand part represents the outer tube in side elevation.

Figure 1:
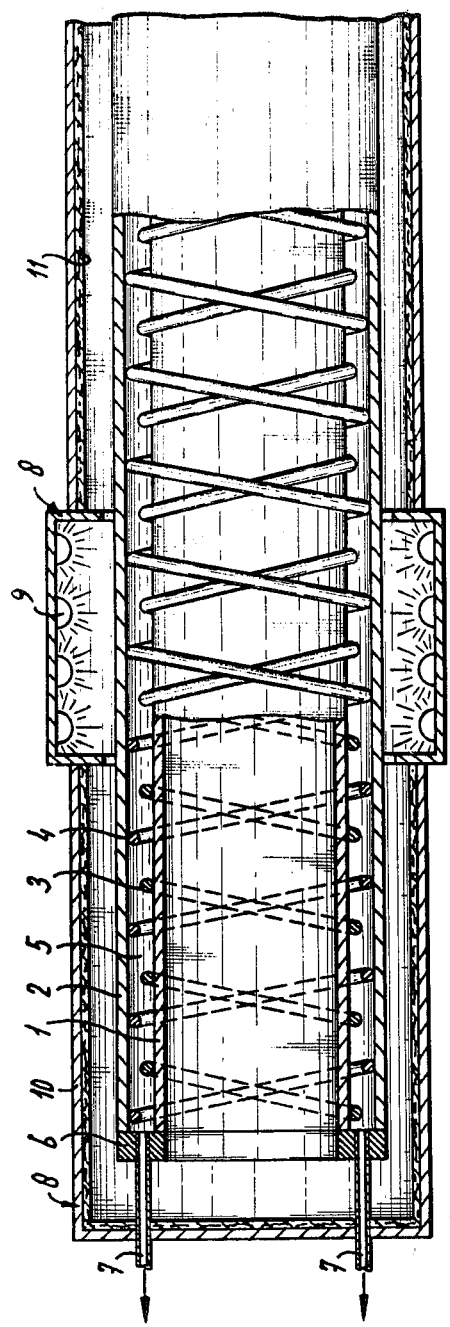
FIG. 1 represents a composite tube according to the invention partially in cross section prior to the bonding process.

The inner tube 1 preferably consists of nickel or a nickel alloy. The reinforcement comprises two molybdenum wires 3 and 4 firmly wound helically and cross wise in opposite directions. In the left hand part of FIG. 1 the wires 3 and 4 are also shown in cross section, the fully drawn lines representing the position of these wires at the back side of the inner tube 1. The middle part of FIG. 1 shows the molybdenum wires 3 and 4 wound cross wise about this tube.

The outer tube 2 is slid over this wire reinforcement preferably in a close fitting manner, until the end faces of the two tubes 1 and 2 have reached the coplanar position in the left hand part of the drawing, as well as in the not shown right hand part. The tube 2 should be slid in a so closely fitting or slidingly fitting manner over the molybdenum wires 3 and 4 that there will yet remain a sufficient number of axial passages for enabling the evacuation of the entire gap 5 along the entire length of the tube.

In order to bond together the inner and outer tubes 1 and 2 in the openings between the molybdenum wires 3 and 4 the thus formed combination of tubes and wires is then introduced into a gas pressure chamber-furnace combination 8. This pressure-furnace combination 8 may include a thermally insulated tight pressure wall 10 having a heat insulation 11 which furnace combination surrounds the tubes to be bonded and will be filled preferably with an inert gas. The pressure furnace combination 8 is shown in FIG. 1 diagrammatically only. The furnace is heated by means of radiation elements 9. The required pressure to bond the tubes 1 and 2 is achieved by increasing the pressure of the inert filling gas.

The extremities of the tubes 1 and 2 giving access to the initial inner gap 5 may be sealed off provisionally for instance by welding or by means of rings 6 in which there have been provided suction openings for tubes 7 for evacuating the gap. The tubes 7 communicate with the said inner gap 5 and lead to one or more not shown vacuum pumps which have been arranged outside the pressure chamber furnace combination 8.

The operative furnace part may be in the shape of a ring or a short tubular section projecting from the pressure wall and also arranged coaxially about the tubular combination like the pressure wall.

The tubular combination may then be moved lengthwise through the pressure furnace 10, 8 or the tubular combination may be mounted stationary while the pressure furnace 10, 8 is moved in the longitudinal direction along the tubular combination.

After introducing the tubular combination into the pressure chamber a vacuum is created in the inner gap 5. In case the tubes consist of nickel or a nickel alloy and the reinforcement consists of molybdenum wires 3 and 4 the pressure of the inert filling gas in the pressure chamber is then increased until during this tube preparation step a pressure of from 4500 to 5000 kPa (45-50 atmospheres) is exerted at the same time on the inner surface of the inner tube 1 and on the outer surface of the outer tube 2. Preferably the vacuum conditions in the inner gap 5 are maintained upon exerting said pressure. Also upon exerting said pressure the tubular combination is heated to a temperature of about 1300° C. At the location where this temperature is reached the limit of stretching strain of the tube material will be surpassed so that the pressure exerted on the outside of the tubes 1 and 2 and the vacuum conditions between the tubes 1 and 2 will then force the tubes towards each other whereby first the openings between the wires 3 and 4 are filled. The pressure and the temperature should finally be increased to such a value that the material of the tube 1 and of the tube 2 in contact with one another is subject to a complete fusion, that is to say that there will be achieved a fusion weld of excellent quality between the tubes 1 and 2 completely embedding the wires 3 and 4. Because the wires consist of molybdenum, they will not be deformed upon exerting the above said high preparation pressure and temperature. However, between said wires the wall material of the inner and outer tube will be pressed upon one another. Hence, the final tube will show the corrugated structure of FIG. 2.

Figure 2:
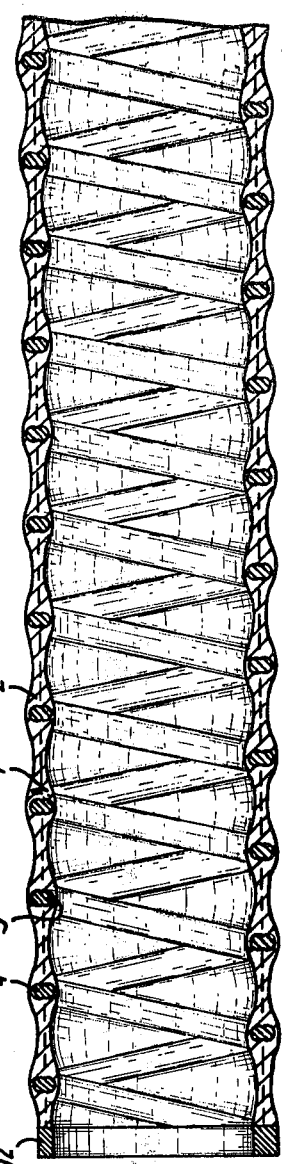
FIG. 2 represents a tube according to the invention in cross section after the bonding process and comprising a sealing ring to the left hand end face. For clarity's sake the tube shown in FIG. 2 has been rotated over 90° around its axis with respect to the tube shown in FIG. 1.

The interrupted line drawn in FIG. 2 at the location of the imaginary cylinder plane of the wires 3 indicates the position where the two tubes 1 and 2 have been bonded together. This line, however, is only an imaginary line because in practice the fusion is so complete that no material transition may be observed.

In FIG. 1 there has been represented an embodiment in which, as stated above, two uninterrupted wires 3 and 4 have been wound cross wise on and around the inner tube 1. It will be evident, however, that the invention is not restricted to this embodiment. Instead of two wires one may use more wires which may for instance be wound between one another. The winding pitch does not have to be constant everywhere and may for instance be choosen smaller at higher cracking process temperature locations.

Likewise, there may first be placed several parallel wires on the inner tube 1 in the longitudinal axial tube direction on which one or more wires are then wound helically.

When choosing the wall thickness of the tubes 1 and 2 one will of course have to take in account that there will remain in the corrugated end product a sufficient rest wall thickness between the exterior tube surfaces and the wires, also at the locations where two wires 3 and 4 intersect each other and rest upon each other and that these wires also remain completely embedded on all sides.

The invention is not restricted to wires having a round cross section. Also instead of wires one may use bands or strips or even a relatively wide meshed woven tubular netting. Likewise use may be made of a tubular reinforcement of sheet material having a large number of openings distributed over the entire reinforcement through which the material of the tubes 1 and 2 may fuse together.

The end faces of the pipe sections bonded together may be covered by a ring 12 which is preferably obtained by building up welding. This ring may be constituted by the ring 6 represented in FIG. 1 and will preferably be composed of the same material as the material of the tubes 1 and 2.

A cracking plant in which the tubes of the present invention are used may comprise such uninterrupted tubes having a length of 10–20 m and an outer diameter of 130 mm. It will be evident, however, that likewise tubes of different sizes may be produced and used in cracking plants. Tubes having a larger diameter and smaller wall thicknesses will show a smaller temperature differential over the wall thickness and as a consequence a higher heat current density. The slight temperature differential across the wall moreover leads to an increase of the maximally feasible process temperature of the medium within the tube. The possibility of using tubes of a sufficient strength and having a large diameter has a favourable effect on the total heating surface to be installed.

It is self evident that the invention is not restricted to the represented and above-discussed embodiment of the tube and that modifications and amplifications may be made without leaving the scope of the invention.

I claim:

1. A cracking tube for a cracking plant in which tube the cracking reaction occurs at a temperature of 900° and 1300° C. and at a pressure 200–500 kPa, said cracking tube having a corrugated structure prepared from an inner tube consisting of a metal capable of withstanding at, above said temperature, an aggressive corrosive medium which may prevail inside the inner tube, a reinforcement having been placed about said inner tube, said reinforcement being provided with a plurality of openings between the reinforcement parts and consisting of a metal capable of withstanding, at above said temperature compressive and tensile forces, to be exerted on the tube at above said pressures, an outer tube coaxially positioned about the inner tube and the reinforcement and consisting of a metal capable of withstanding at above said temperature an aggressive corrosive medium which may prevail outside the outer tube, said reinforcement being made of tungsten, molybdenum or tantalum or alloys of tungsten, molybdenum or tantalum, said inner tube and the outer tube being made of nickel or nickel alloy and having been bonded together in the openings between the reinforcement parts upon application of heat and pressure on the inner surface of the inner tube and outer surface of the outer tube while applying vacuum to the openings between the reinforcement parts.

2. The tube of claim 1, wherein the reinforcement is made of molybdenum.

3. The tube of claims 1 or 2, wherein the reinforcement consists of several wires wound cross wise in opposite direction about the inner tube.

4. The tube of claim 1, wherein the reinforcement consists of several strips wound about or arranged on the inner tube, respectively.

5. The tube of claim 1, wherein the end of the inner and the outer tubes have been capped by a ring of the same material as that of the tubes.

6. The tube of claim 6, wherein the ring has been applied by building up welding.

7. The tube of claim 1, wherein the inner and outer tubes consist of Inconel 601.

* * * * *